March 6, 1973 L. W. BROWN ET AL 3,719,145
RECOVERY DEVICE EJECTION BAFFLE SYSTEM FOR MINATURE ROCKETS
Filed July 21, 1971 2 Sheets-Sheet 1

INVENTORS.
LEROY E. PIESTER
LAWRENCE W. BROWN
BY
Drummond & Phillips
ATTORNEY

March 6, 1973   L. W. BROWN ET AL   3,719,145
RECOVERY DEVICE EJECTION BAFFLE SYSTEM FOR MINATURE ROCKETS
Filed July 21, 1971   2 Sheets-Sheet 2

INVENTORS.
LEROY E. PIESTER
LAWRENCE W. BROWN
BY
*Drummond & Phillips*
ATTORNEY

United States Patent Office 3,719,145
Patented Mar. 6, 1973

3,719,145
RECOVERY DEVICE EJECTION BAFFLE SYSTEM
FOR MINATURE ROCKETS
Lawrence W. Brown and Leroy E. Piester, Phoenix, Ariz.,
assignors to Centuri Engineering Company, Inc.
Filed July 21, 1971, Ser. No. 164,522
Int. Cl. F42b 13/38
U.S. Cl. 102—34.4                                         7 Claims

ABSTRACT OF THE DISCLOSURE

A baffle system for operatively controlling the pyrogenic gas pressure front created by the ejection charge of a rocket engine to eject the recovery device from the body of a miniature rocket. The baffle system, which may be permanently secured within the rocket body, cools the pyrogenic gas and separates the ignescent particles therefrom and directs the pressure front thereafter directly against the recovery device.

The present invention concerns miniature rockets.

More specifically, the invention relates to devices for controlling the pyrogenic gas which ejects the recovery device such as a parachute from a miniature rocket.

In a further aspect, the invention concerns a new and novel baffle system for cooling the pyrogenic gas and separating the ignescent particles therefrom and thereafter directing the pressure front therefrom to operatively bear directly against the parachute to eject the recovery device from the rocket body.

Miniature rockets while varying in size, shape, and physical appearance are generally functionally analogous. The main element is an elongate tubular body having a leading end and a trailing end. A nose cone is releasably affixed to the leading end and a rocket engine is housed within the trailing end. A recovery device, usually a parachute, having shroud lines normally attached to the body tube and to the nose cone, is carried within the body between the rocket engine and the nose cone.

The rocket engine comprises three charges: the propellent charge, the delay charge, and the ejection charge. The propellent charge after ignition develops thrust which lifts the rocket from the launching pad and propels the rocket upwardly. As the propellent charge burns out, it ignites the delay charge which allows the rocket to coast up to its maximum altitude, or apogee, where the forward momentum of the rocket diminishes and it begins its descent to earth. At this stage the delay charge ignites the ejection charge. The ejection charge creates a pyrogenic gas which exerts pressure upon the parachute, pushing it toward the leading end of the rocket thereby displacing the nose cone and ejecting the parachute from the tubular body. The miniature rocket then descends, supported by the parachute to provide a soft landing for undamaged recovery of the rocket. The aforesaid pyrogenic gas creates a pressure front having ignescent particles.

The quest for maximum altitude flights has been the subject of considerable engineering. The rocket must be properly aerodynamically designed, have sufficient structural strength, and yet maintain minimum weight. The conventional miniature rocket, as utilized by the hobbyist, is relatively lightweight, having a weight of up to only sixteen ounces. To maintain weight limits and for proper functioning, the parachute is constructed of extremely lightweight materials. These materials, commonly plastic, silk, or nylon, are characteristically thin and flammable; particularly in the case of the preferred material which is .0005 inch-thick Mylar. It is imperative, therefore, that the parachute material be protected from the pyrogenic gas of the ejection charge. This is normally accomplished by packing parachute wadding, generally fireproofed cotton, or crepe paper, between the parachute and the rocket engine.

The wadding absorbs the pyrogenic gas, both the pressure front and the ignescent particles contained therein, and functions both as a buffer and as a piston to eject the parachute. However, the wadding has certain inherent limitations. If an overabundance of wadding is utilized, it will not function properly as a piston and will, therefore, not eject the parachute. Conversely, if insufficient wadding is used, the ignescent particles and the super-heated gasses will penetrate and readily burn the parachute, rendering it inoperable. Further, as engineering efforts are directed at increasing the reliability of the entire miniature rocket and simplifying the art, the rocketeer is burdened with the necessity of providing a supply of wadding which must be carried at all times and is also dependent upon his own judgment as to the proper amount of wadding to be used.

It would be highly advantageous therefore, to provide a simplified reliable buffer between the ejection charge and the recovery device.

Accordingly, it is the primary object of the present invention to provide a recovery device ejection baffle system which may be either permanently housed within the rocket or removable therefrom.

Another object of the invention is to provide a recovery device ejection baffle system in which the pressure front created by the pyrogenic gas of the ejection charge may be directed to operatively bear directly against the recovery device and eject the recovery device from the tubular body with substantial reliability.

Yet another object of the present invention is to provide a baffle system for lowering the pyrogenic gas temperature and extinguishing and separating the ignescent particles therein prior to the pressure front reaching the recovery device.

Yet still another object of the present invention is to reduce the supplies required by the rocketeer and to simplify the rocket launching procedure.

These and other more specific objects and advantages of the present invention will become readily apparent to those skilled in the art from the following detailed description of the preferred embodiment thereof, taken in conjunction with the drawings in which.

Briefly, to accomplish the desired objectives of our present invention in accordance with a preferred embodiment thereof, we provide a pair of space disks, each shaped and sized to substantially seal within the rocket body. Each disk has at least one aperture therein such that the vertical axis of the aperture of one disk is displaced from the vertical axis of the aperture of the second disk. Preferably, an elongate tubular member extends between the two disks to maintain them in spaced relationship. The baffle system may then be inserted into the rocket tube, and optionally glued or otherwise permanently or semi-permanently secured at the proper location.

As the ejection charge burns, it creates a pyrogenic gas having ignescent particles and a pressure front. The pressure front is relatively unaffected by deviations from a straight path and therefore passes through the baffle system to operatively bear directly against the recovery device. Ignescent particles, however, if uninhibited, tend to travel in a straight line.

The baffle system is spaced from the rocket engine at a minimum distance approximate its own spacing between the disks. Normally ambient air resides within the baffle system and between the baffle system and the rocket engine. The injection of the pyrogenic gas into the ambient air, and the inter-action thereof within the diversion of the hot gas through the offset apertures, creates a turbulence behind and within the baffle system. The pyrogenic gas is, therefore, substantially cooled when introduced into the ambient air which usually also extinguishes minor ignescent particles. The turbulence circulates and delays the gas permitting further cooling of the pyrogenic gases and burning up of most residual ignescent particles prior to the pressure front reaching the recovery device.

It will become readily apparent that the baffle system of the present invention represents a substantial improvement over conventional wadding. In addition to the simplification of the launching procedure and reduction of supplies, the baffle system eliminates human error and guesswork.

Figures 1, 2:
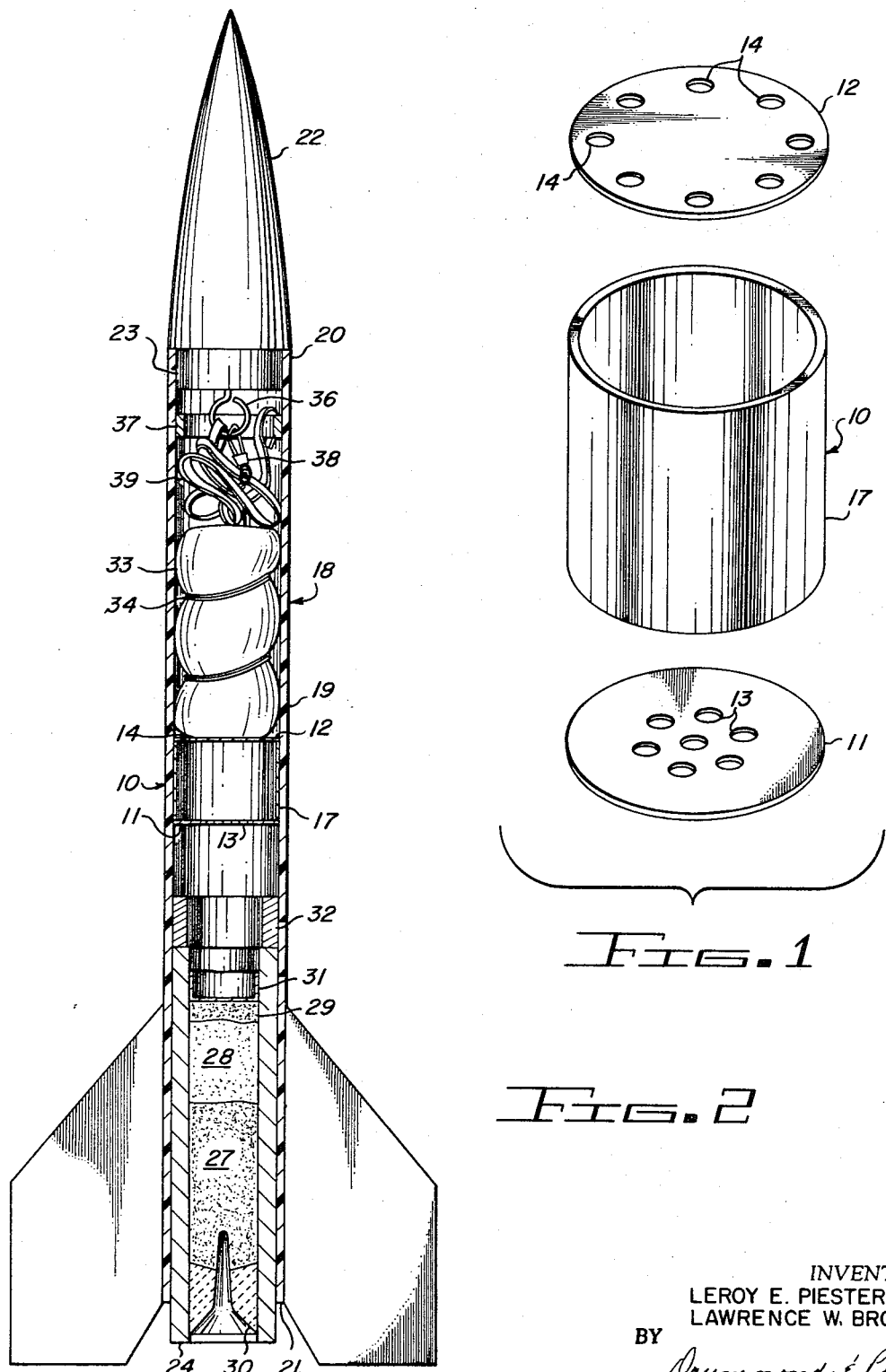
FIG. 1 is an exploded isometric view of a recovery device ejection baffle system constructed in accordance with the teachings of the present invention.
FIG. 2 is an elevation view, in section, of a conventional miniature rocket as it would appear when prepared for launching and having implaced therein the device of the present invention.

Turning now to the drawings in which the same reference characters indicate the corresponding elements throughout the various views, FIG. 1 illustrates the presently preferred embodiment of the invention chosen for purposes of illustration and shows the recovery device ejection baffle system generally designated by the reference character 10, and having a first disk 11 and a second disk 12. The disk 11 has a plurality of centrally spaced apertures 13 while the other disk 12 has a plurality of circumferentially displaced apertures 14. An elongate angular tube 17 is disposed between the disks 11 and 12 to maintain the disks in a spaced relationship. Preferably, the disks 11 and 12 would be secured by gluing or other appropriate means to the ends of the tube 17.

FIG. 2 illustrates a conventional miniature rocket, generally designated by the reference character 18, as it would appear when ready for launching. The miniature rocket 18 has an elongate tubular body 19 having a leading end 20 and a trailing end 21. The aerodynamically shaped nose cone 22 has a downwardly projected annulus 23 which is frictionally supported within the leading end 20 of the tubular body 19. A rocket engine 24 carried within the trailing end 21 has a propellent charge 27, a delay charge 28, and an ejection charge 29. The nozzle 30 directs the thrust of the propellent charge and a thin retaining cap 31, generally constructed of clay, paper or similar material, seals the ejection charge 29. A thrust ring 32 secured within the body 19 transfers the thrust from the rocket engine 24 to propel the rocket 18 to an apogee.

A recovery device, here shown as a parachute 33, having shroud lines 34 is positioned within the body 19 behind the nose cone 22. A screw eye 36 threadedly engages the nose cone 22 and an anchor ring 37 is secured within the body 19. A snap swivel 38 secures the shroud lines 34 to the screw eye 36. An elastomer shock cord 39 extends between the screw eye 36 and the anchor ring 37.

The ejection baffle system 10 of the present invention is secured within the tubular body 19, spaced from the thrust ring 32 and abutting the parachute 33. As specifically shown herein, the disk 11 having centrally located apertures 13 faces the rocket engine while the other disk 12 having circumferentially displaced apertures 14 abuts the parachute. However, it will be understood by those skilled in the art that the baffle system 10 may be inserted in either direction since it is understandably insignificant to the operation of the baffle system which specific disk resides in which specific location.

Figure 3:
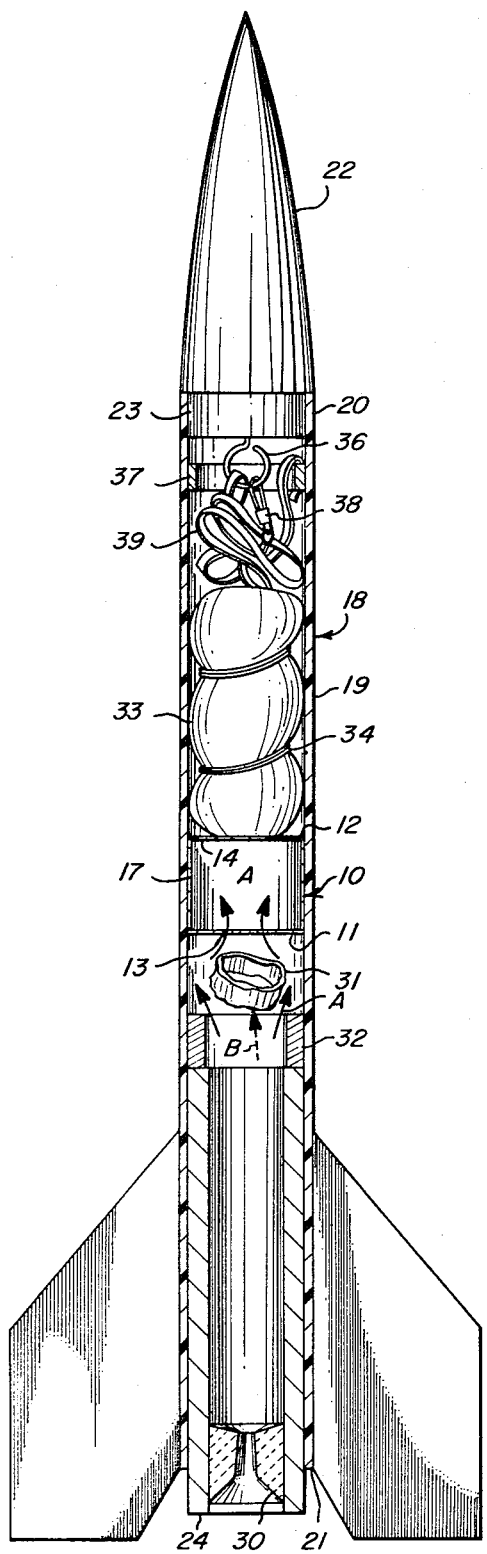
FIG. 3 is an elevation view, in section, of the miniature rocket of FIG. 2, as it would appear during burning of the ejection charge.
Figure 4:
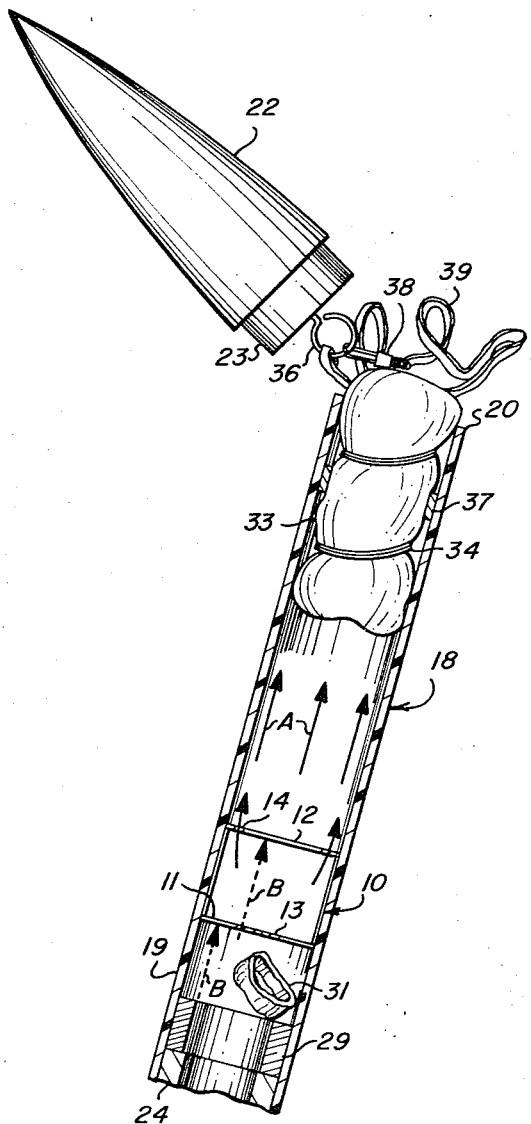
FIG. 4 is a partial elevation view, in section, of the device of FIG. 3 after the miniature rocket has reached its apogee and the parachute is being ejected.

FIG. 3 depicts the miniature rocket 18 at approximately the apogee thereof. The propellent charge 27 and the delay charge 28 have been fully expended. The ejection charge 29 has been ignited by the delay charge 28 and transformed into a pyrogenic gas. The expanding gas creates a pressure front directed toward the leading end of the rocket as shown by the solid arrows A which dislodge the retainer cap 31 from its securement within the rocket engine 24 through the thrust ring and into the area of the tubular body 19 between the thrust ring 32 and the parachute ejection baffle system 10. Ignescent particles, still burning fragments of the ejection charge, are present within the pyrogenic gas and travel with the pressure front in the same general area. However, as indicated by the dashed line arrows B, the ignescent particles tend to travel in a straight line. The juxtaposed position of the retainer cap 31 and the ejection charge 29 during ignition of the ejection charge results in partial destruction of the retainer cap 31 which is further enhanced by continued buffeting of the retainer cap 31 by the ignescent particles. FIG. 4 depicts, in fragmentary view, the miniature rocket 18 at a flight phase momentarily later than the flight phase previously detailed in FIG. 3. The pressure front has passed through the baffle system 10 to bear directly against the parachute 33 urging the parachute toward the leading end 20 of the rocket body 19 and displacing the nose cone 22. The miniature rocket, as specifically shown in this view, having attained its peak altitude and lost its forward momentum, has begun to roll over. After the parachute has been completely ejected, it will open, suspending the nose cone and the rocket body from the shroud lines to provide a soft landing for undamaged recovery of the rocket.

As illustrated by the dashed arrow lines B, a substantial quantity of the ignescent particles is separated from the gas upon striking the first disk 11. Those particles passing through the apertures 13 in the disk 11 will strike the second disk 12. The distance from the rest position of the ejection charge 29 to the second disk 12, and turbulent routing of the gas therewithin provides a cooling range for dissipation of the heat from the pyrogenic gas and further provides time for complete burning of the ignescent particles. It will be readily apparent therefore, that the baffle system 10 assures a substantially cooled pressure front bearing directly against the parachute.

In the foregoing detailed description of the drawings, the recovery device ejection baffle system has been specifically illustrated as a pair of spaced disks; one of said disks having centrally located apertures and the second disk having circumferentially located apertures. It will be readily apparent to those skilled in the art that according to the teachings of the present invention of principles embodied therein could be extended to incorporate any pattern of apertures within the pair of spaced disks, provided that the vertical axis of any one aperture of either one disk is displaced from the vertical axis of any given aperture within the second disk. Further, it is apparent that while the disks were maintained in a spaced relationship by an annular tubular member secured within the body tube, the disks could be retained by an impression or other suitable means within the wall of the rocket body. Nor is it necessary that the baffle system, when incorporating the annular tubular spacer, be positionally fixed. Neither the function of the baffle system nor the spirit of the invention are impaired by a baffle system that is slideable within the tubular body.

Various other changes in the device herein chosen for purposes of illustration will readily occur to persons skilled in the art. Such modifications and variations while not explicitly denoted in the foregoing detailed description do not deviate from the teachings of the present invention and are intended to be included in the scope and spirit thereof.

Having fully described and disclosed the invention, and what we conceive to be the presently preferred embodiment thereof, in such a manner as to enable those skilled in the art to understand and practice the same, we claim:

1. In a miniature rocket adapted to be propelled to an apogee by a rocket engine and further adapted to descend from said apogee suspended from a recovery device, such as a parachute, which miniature rocket includes:

a tubular body having a leading end and a trailing end, a nose cone releasably affixed to said leading end, a rocket engine positioned proximate said trailing end and having a propellent charge and an ejection charge, a recovery device fastened to said miniature rocket and carried within said tubular body proximate said leading end thereof, and a recovery device protector wad disposed between said rocket engine and said parachute, wherein the propellent charge of said rocket engine propels said miniature rocket to said apogee and thereafter ignites said ejection charge, and upon ignition, said ejection charge creates a pyrogenic gas having ignescent particles and a pressure front absorbed by said recovery device protector wad and urging same toward said leading end thereby displacing said nose cone and ejecting said recovery device from said tubular body, the improvement therein comprising a recovery device ejection baffle system adapted to be disposed within said tubular body between said recovery device and said rocket engine, said recovery device baffle system comprising:

(a) means for directing said pressure front to operatively bear directly against said recovery device to eject said recovery device from said tubular body, and (b) means for separating said ignescent particles from said pyrogenic gas and cooling said pyrogenic gas prior to said pressure front reaching said recovery device.

2. The recovery device ejection baffle system of claim 1, including:

(a) a first disk transversely disposed within said tubular body, having an aperture therein and sized to substantially seal within said tubular body, and (b) a second disk, spaced from said first disk, having an aperture therein and sized to substantially seal within said tubular body;

the aperture of said first disk having a vertical axis transversely displaced from the vertical axis of the aperture of said second disk.

3. The recovery device ejection baffle system of claim 2, wherein one of said disks has an aperture proximate the center thereof and the other said disk has an aperture proximate the circumference thereof.

4. The recovery device ejection baffle system of claim 2, wherein one of said disks has a plurality of centrally spaced apertures and the other said disk has a plurality of circumferentially radially outwardly displaced apertures.

5. The recovery device ejection baffle system of claim 2, in combination with means for maintaining said first disk spaced from said second disk.

6. The recovery device ejection baffle system of claim 5, wherein said means for maintaining said first disk spaced from said second disk comprises an elongate annularly tubular member extending between said first disk and said second disk.

7. The recovery device ejection baffle system of claim 6, wherein said elongate annular tubular member is sized and adapted to be sealingly fixed within said tubular body.

References Cited
UNITED STATES PATENTS

| | | | |
|---|---|---|---|
| 2,779,281 | 1/1957 | Maurice et al. | 102—39 |
| 2,841,084 | 7/1958 | Carlisle | 102—34.4 X |
| 3,558,285 | 1/1971 | Ciccone et al. | 102—39 X |

ROBERT F. STAHL, Primary Examiner

U.S. Cl. X.R.

102—35.6, 95